United States Patent [19]
Stevens

[11] Patent Number: 5,813,682
[45] Date of Patent: Sep. 29, 1998

[54] METHOD FOR EQUALIZING THE LOAD ONTO THE REAR WHEELS OF A TRUCK TRAILER WITH A TRAILER SLIDER STOP PIN

[76] Inventor: Duncan A. Stevens, 21186 Avalon Rd., Rocky River, Ohio 44116

[21] Appl. No.: 591,284

[22] Filed: Jan. 25, 1996

[51] Int. Cl.$^6$ .................................................. B62D 61/10
[52] U.S. Cl. .................................. 280/149.2; 180/24.01; 180/24.02; 180/209
[58] Field of Search ................................ 280/149.2, 147; 180/24.01, 24.02, 209

[56] References Cited

U.S. PATENT DOCUMENTS

| | | | |
|---|---|---|---|
| 2,831,700 | 4/1958 | Sheppard et al. | 280/407.1 |
| 2,841,411 | 7/1958 | Sheppard et al. | 280/149.2 |
| 5,480,171 | 1/1996 | Cheffey | 180/24.02 |
| 5,531,467 | 7/1996 | Schueman | 180/209 |
| 5,564,727 | 10/1996 | Wessels | 280/149.2 |

OTHER PUBLICATIONS

"My Red Head" Brochure.

Primary Examiner—Eric D. Culbreth
Attorney, Agent, or Firm—Robert J. Fay

[57] ABSTRACT

A method of adjusting wheel loading in a trailer having a trailer body with apertured channel members on the bottom, a wheel bogie having a braking mechanism and a pair of apertured channel members on the top thereof which engage the channel members of the trailer body to permit relative sliding movement between the trailer body and the wheel bogie, a locking mechanism having a pair of movable locking pins for locking the trailer body to the wheel bogie when the locking pins are extended through the apertures in the channel members wherein the method includes the steps of assessing the wheel loading of the trailer, setting the brake of the wheel bogie, retracting the locking pins to permit relative movement between the trailer body and the wheel bogie, inserting a trailer slider stop pin in an aperture of each trailer channel at a position where the trailer body is to be stopped relative to the wheel bogie and moving the trailer body relative to the wheel bogie until movement of the trailer body is arrested by the trailer slider stop pins.

3 Claims, 2 Drawing Sheets

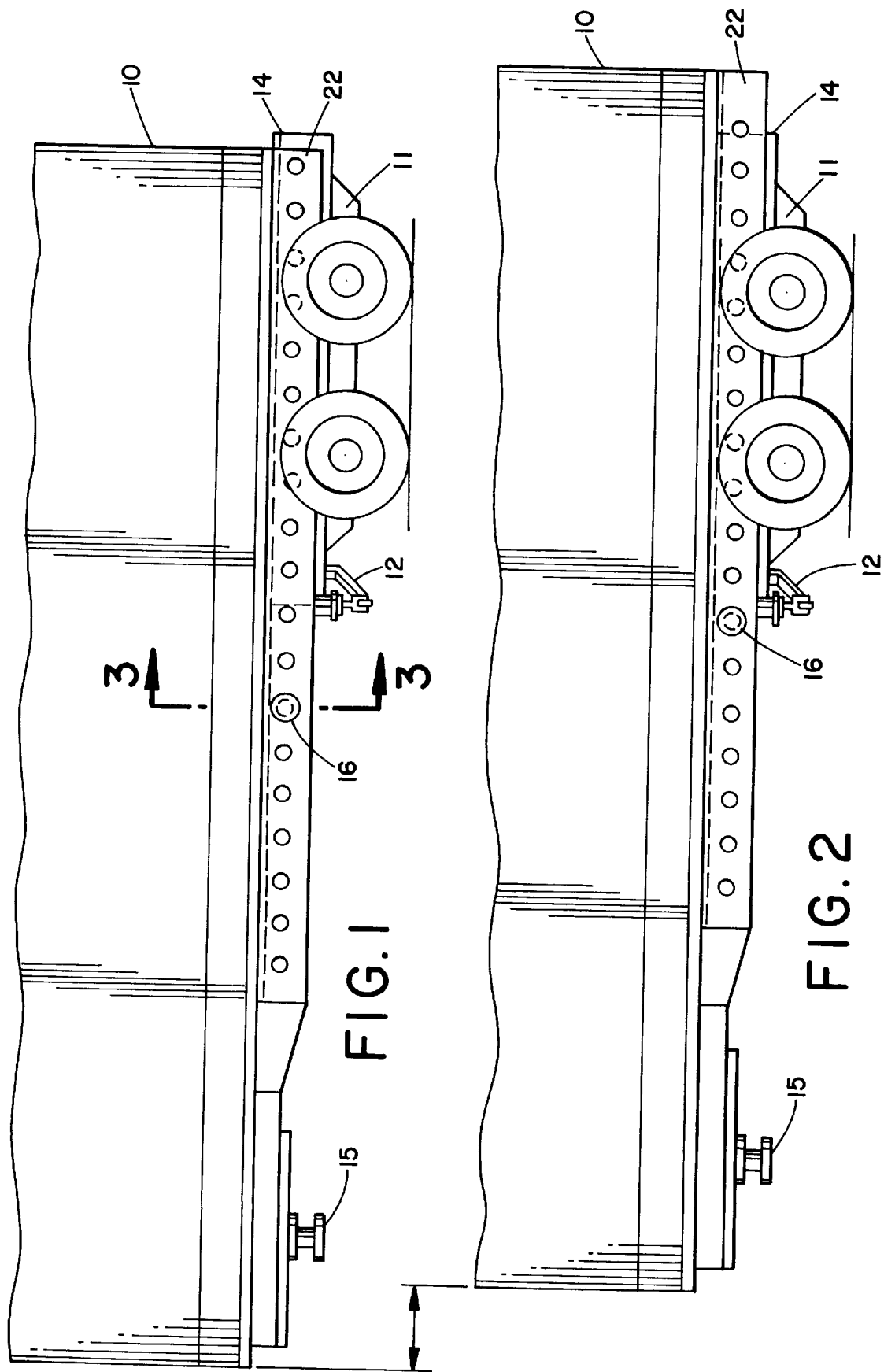

METHOD FOR EQUALIZING THE LOAD ONTO THE REAR WHEELS OF A TRUCK TRAILER WITH A TRAILER SLIDER STOP PIN

BACKGROUND OF THE INVENTION

This invention is directed to a trailer slider stop which allows a driver to adjust the loading on the rear wheels of a trailer by himself, so that load limits are not exceeded.

In the trucking business there is a need to improve the means for adjusting the load on the rear wheels so that the load limits are not exceeded. Frequently in adjustable load trailers, which are a high proportion of the truck trailer market, a driver is required to change the load and consequently the weight distribution such that some wheels may be overloaded. Without another person to help adjust the loading on the wheels of a trailer, a driver will do a lot of guessing before the loading is adjusted so that the wheels are not overloaded.

In many trailers, a trailer locking and adjusting mechanism which locks the trailer bogie to the trailer with heavy pins moved outwardly by a device taught in DeLay U.S. Pat. No. 2,900,194 and other patents is commonly used. This device locks the trailer body and bogie in at least 4 places, 2 forward and 2 rear on the trailer.

SUMMARY OF THE INVENTION

This invention relates to a method using a trailer slider stop pin by which a driver, after unloading or loading cargo, can use a DeLay type trailer adjustment mechanism to adjust the wheel loading by himself.

A driver assesses the best wheel loading position by using scales, and releases the trailer lock mechanism so that the trailer body and bogie are uncoupled. He then sets the trailer brakes so that the wheels will not move, but the trailer body will slide on channels of the wheel boogie. When the driver releases the clutch of a truck to slide the trailer body, a tremendous surge of power is put on both the clutch and the drive lines. The less often a driver must do this, the less potential for damage to the clutch, fly wheel and drive lines. The driver then places a trailer slider stop pin in the desired position on each apertured channel member attached to the trailer body, and moves the truck and trailer body relative to the bogie, until a portion of the trailer body hits the trailer slider stop pins and stops. The stop pins must be rugged to withstand rough treatment. Each trailer slider stop pin is tapered to allow it to sag in the channel opening. The driver then locks the adjustment mechanism. This sets the trailer body and wheel bogies in a new position. The trailer slider stop pins are then removed and stored until needed again. Characteristics of the trailer slider stop pins are important in that they extend the life of the slider stop pins and allow some play in the channel, so that it does not cling with debris in the channel member. It is desirable that each slider stop pin droop or sag within its tolerances. The droop of each slider stop pin is caused by the weight of metal in the tapered portion relative to the weight in the head.

Having thus described the broad features of the invention, the following is the specification.

BRIEF DESCRIPTION OF THE DRAWINGS

FIG. 1 is a side view of a trailer body and wheel bogie showing the channel members of the trailer body and the wheel bogie locked together and a trailer slider stop pin positioned in an aperture in a channel member of the trailer body;

FIG. 2 is another side view of the trailer body and wheel bogie showing the wheel bogie shifted several openings to the left to abut against the trailer slider stop pin in the channel member of the trailer body;

DETAILED DESCRIPTION OF THE PREFERRED EMBODIMENTS

Figure 4:
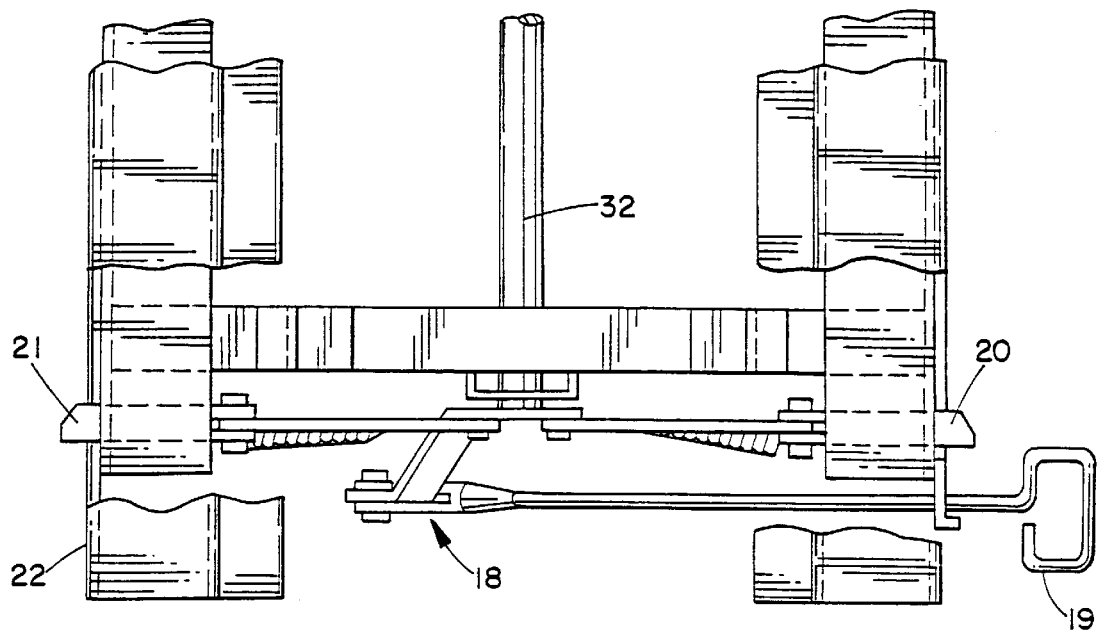
FIG. 4 is a top view of the locking mechanism of FIG. 3.

FIG. 1 is a side view of a trailer body 10 having a wheel bogie 11 attached thereto. An adjustment locking mechanism 12 is provided for locking the trailer body to the wheel bogie. A pin 15 is a part of a trailer plate which attaches to a fifth wheel of a tractor. There is a distinct difference in the position of the trailer body and its load in FIGS. 1 and 2 in that the load is carried more to the rear of the wheel bogie wheels in FIG. 2. A trailer slider stop pin is shown at 16 in FIG. 1, two positions to the left in the drawing from the position where the locking mechanism 14 is illustrated. After the trailer body has been moved backwardly relative to the wheel bogie as shown in FIG. 2, the locking mechanism is adjacent the trailer slider stop pin 16.

Figure 3:
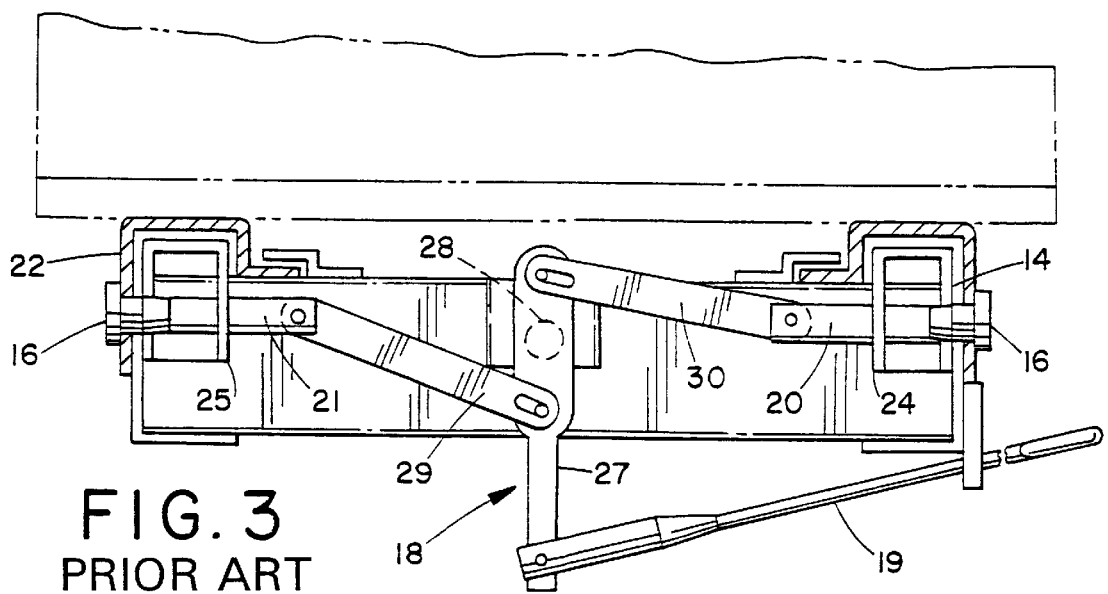
FIG. 3 is a view along line 3—3 of FIG. 1 showing a trailer locking mechanism of the DeLay type.

As shown in FIG. 3, the locking mechanism 12 has a lever 18 operated by an activator 19 and a pair of heavy duty pins 20 and 21 that extend and retract to function as locking pins which couple the trailer body channel members 22 and the wheel bogie channel members 14. Fastened to the wheel bogie is another channel member 24 on the right and a channel member 25 on the left. When the activator 19 is pushed, the pins 20 and 21 couple the channel members 22 of the trailer body and the channel members 14, 25 and 24 of the wheel bogie. When activator 19 is extended to the left in FIG. 3, the driven member 27 pivots on the bogie at 28 to drive away struts 29 and 30 outwardly to lock pins 20 and 21, through the channels referred to above. At the same time a drive shaft drives another pair of locking pins equivalent in structure at the other end of the wheel bogie.

Figure 5:
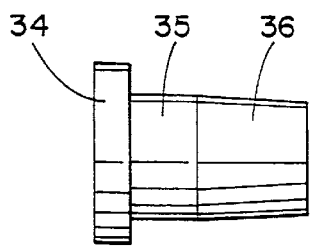
FIG. 5 is an enlarged side view of the trailer slider stop pin of this invention showing a tapered end portion.
Figure 6:
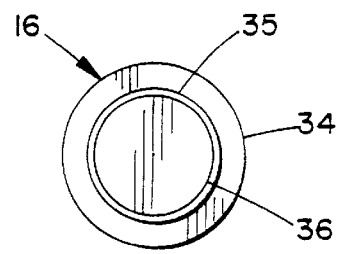
FIG. 6 is an end view of the trailer slider stop pin of FIG. 5.

FIGS. 5 and 6 show a trailer slider stop pin which has thick head 34 such as ⅜" of steel, a collar 35 of cylindrical shape 1" or more thick, and a tapered portion 36 at least 1½" long and tapered from about 1¼" to about 1" in that distance. This allows the stop pin to droop or sag within the limits of the tolerances of the stop pin, so that it may stay in place during rough usage.

Having thus explained the invention as to the method of usage and the stop pin in its characteristics, I do not wish to be limited more than by the claims which follow.

I claim:

1. A method of adjusting wheel loading in a trailer adapted for use in a truck and trailer combination wherein the trailer comprises a trailer body having a pair of apertured channel members on the bottom thereof, a wheel bogie having a pair of apertured channel members on the top thereof which engage the channel members of the trailer body to permit relative sliding movement between the trailer body and a wheel bogie, and a locking mechanism having a pair of oppositely directed extendible and retractable locking pins for locking said trailer body channel members and said wheel bogie channel members when said pins are extended through apertures in said channel members; said method comprising the steps of:

assessing the wheel loading of the trailer;

setting the brake of the wheel bogie to preclude movement of the wheel bogie;

retracting the locking pins of the locking mechanism to permit relative movement between the trailer body and the wheel bogie;

inserting a trailer slider stop pin in an aperture of each trailer channel member at a position where the trailer body is to be stopped relative to the wheel bogie; and moving the trailer body relative to the wheel bogie until movement of the trailer body is arrested by the trailer slider stop pins.

2. A method of adjusting wheel loading according to claim 1 which further includes the step of removing the trailer slider stop pins from said trailer channel members.

3. A method of adjusting wheel loading according to claim 1 wherein each said trailer slider stop pin has a head portion, a collar of lesser diameter than said head portion, and a tapered pin portion.

* * * * *